United States Patent Office 3,191,430
Patented June 29, 1965

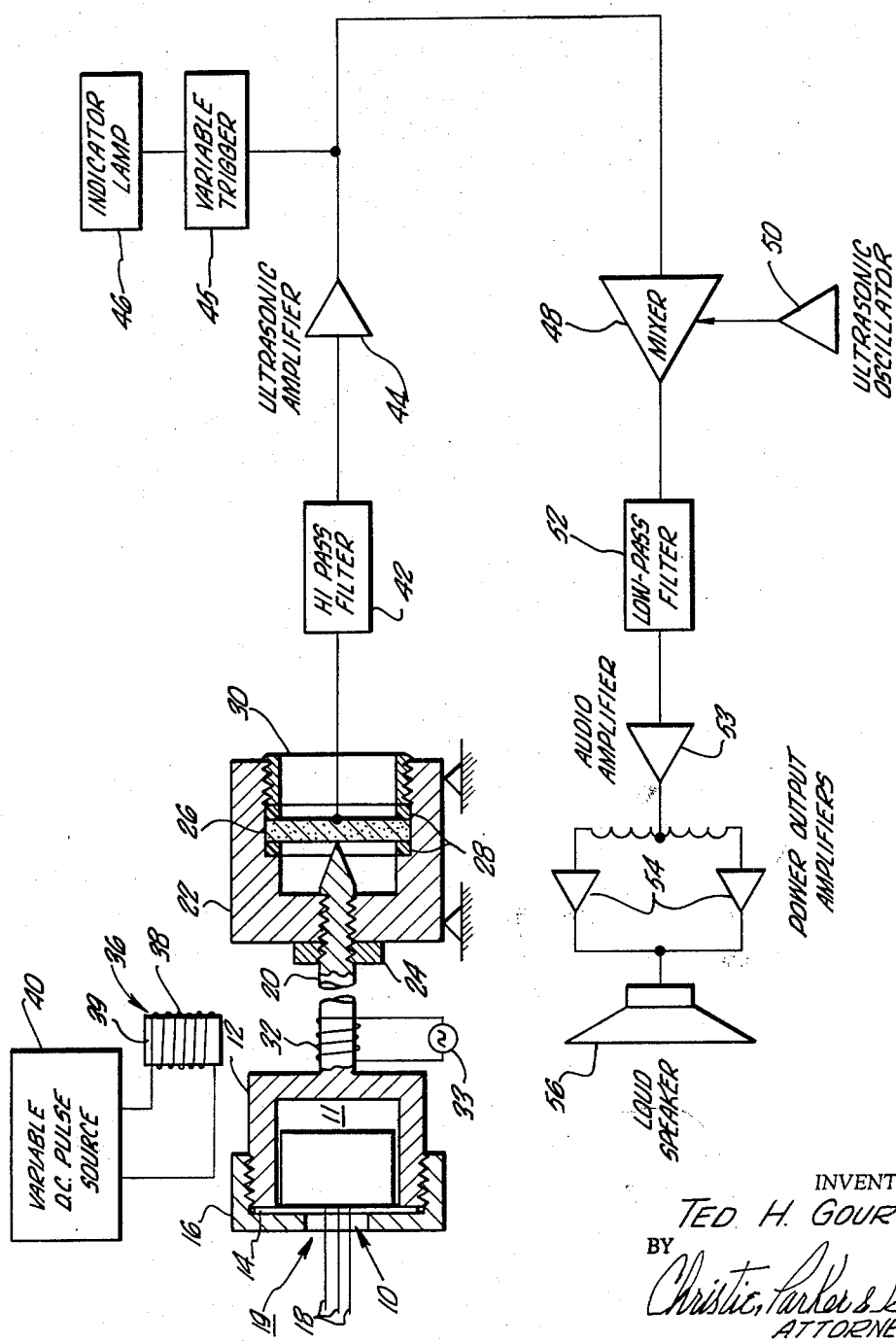

3,191,430
TESTING MEANS USED IN DETERMINING THE PRESENCE OF LOOSE PARTICLES WITHIN A CONTAINER
Ted H. Gourley, Mountain View, Calif., assignor to Delcon Corporation, Palo Alto, Calif., a corporation of California
Filed Nov. 8, 1963, Ser. No. 322,425
9 Claims. (Cl. 73—67)

This invention relates to apparatus and methods for testing articles which emit mechanical vibrations when shaken.

There are many types of articles which, after their manufacture or assembly, require testing to determine if they are properly made. If the articles are defective, they will often emit characteristic sounds in the ultrasonic frequency range when vibrated. Examples are wrist watches, resistors, capacitors, vacuum tubes, transistors, ceramic tubes, electrical connectors, relays, and crystal transducers. Although the invention is applicable to all of these articles, and many others, it is described with specific reference to testing transistors for the presence of particulate contaminants which would interfere with proper operation.

Transistors are well known solid state devices which perform the electrical functions of vacuum tubes. A typical transistor includes a semiconductor element mounted in a case. Electrical leads are attached to the semiconductor element so that it can be connected in a circuit. Occasionally in assembling a transistor, a particulate contaminant, say, a fragment of glass or iron filing, is trapped in a space between the case and the semiconductor element. If the transistor is installed in a circuit subject to vibration and acceleration, say, in a missile or other airborne equipment, the loose contaminant can act as a battering ram and damage either the semiconductor element, or the connections of the electrical leads to it, thus causing malfunction of the transistor.

Numerous attempts have been made to develop satisfactory inspection techniques to detect contaminated transistors, but none of them have been entirely satisfactory. For example, X-ray has been used, but it is expensive, time-consuming, and fails to detect contaminants which have approximately the same density as the components used in assembling the transistors. This invention provides a simple, fast, inexpensive system for testing articles which emit ultrasonic energy when vibrated. For example, when a transistor with a particulate contaminant is vibrated, there often is no readily discernible evidence of the presence of the contaminant. However, ultrasonic mechanical vibrations are produced due to the relative motion between the contaminant and the transistor. Use is made of this phenomenon to test transistors and other articles such as those mentioned above.

Briefly, the apparatus of this invention includes an ultrasonic transducer and an elongated rod with one end mounted adjacent the transducer. A holder is on the rod and spaced from the transducer to hold a device under test. Means are provided for vibrating the rod to shake the holder and device in it to cause any loose part or parts in the device to move and produce ultrasonic vibrations which travel from the holder along the rod to the transducer to produce an electrical signal. Means are also provided for detecting the electrical signal to indicate the presence of ultrasonic vibrations in the device.

Preferably, the rod is vibrated at a frequency below the ultrasonic range, and the ultrasonic transducer is a crystal sensitive in the range of 35 to 45 kilocycles per second.

Electrical filtering means are provided to reject all frequencies from the ultrasonic transducer below the ultrasonic range.

In one form, the means for vibrating the rod produces longitudinal or compressional vibrations, such as by magneto-striction. In another form, the rod is vibrated transversely or laterally with respect to its length. Preferably, means are provided for releasably securing the device to the holder to facilitate quick mounting and removal of different devices under test.

These and other aspects of the invention will be more fully understood from the following detailed description and the accompanying drawing, which is a schematic, partly in cross-section, and partly broken away, of the mechanical and electrical components of the invention.

Referring to the drawing, a device 10, such as a transistor, is disposed in a cylindrical recess 11, of a cylindrical holder 12. The transistor has an outwardly extending flange 14 which rests on the edge of the recess 11 and is clamped firmly in place by an annular cap 16 threaded onto one end of the holder. Electrical leads 18 extend from the transistor through a central opening 19 in the cap.

An elongated rod 20 is formed integrally at one end with the holder and is threaded at its other end into a cylindrical housing 22. A lock nut 24 locks the threaded portion of the rod to the housing. The end of the rod within the housing bears against an ultrasonic transducer 26, which may be a conventional crystal. The transducer is sandwiched between a pair of annular gaskets 28 within the housing and held in place by a threaded ring 30 screwed into the housing.

The rod is caused to vibrate so that the holder and device under test within it is also vibrated. The vibrations may be produced by an electrical winding 32 coiled coaxially around the rod and energized from a conventional alternating source 33 so that the rod, holder, and device are caused to vibrate by magneto-striction in a longitudinal direction with respect to the axis of the rod. A rod made of nickel or any other suitable metal may be used.

Alternatively and preferably, the rod or holder are of ferromagnetic material, and the rod is sufficiently long that it can be vibrated laterally or transversely. For such type of vibration, a magnetic exciter 36 is disposed adjacent the rod. The exciter includes a coil of wire 38 wrapped in the form of a solenoid around a magnetic core 39. The wire is energized from a variable D.C. pulse source 40, so that the free end of the rod, i.e., the end of the rod which carries the holder, is vibrated at an amplitude and frequency adequate to test the device in the holder. For a typical transducer, an acceleration of 30 to 40 times that of gravity at a frequency of 20 to 100 cycles per second is sufficient. A broad range of frequencies are generated in the rod and transistor holder, say, about 10 to several hundred thousand cycles per second.

In another form of the invention, the rod 20 is made of spring steel, and it is caused to vibrate with a simple conventional cam arrangement (not shown). In this case, the spring rod vibrates transversely, as with the magnetic exciter just described. The electronic circuitry is squelched during the initial contact by the cam, and an automatic conventional timing circuit then places the transducer in the circuit for monitoring. The spring continues to vibrate for a few seconds, which provides sufficient monitoring time. For maximum efficiency, the spring rod is caused to vibrate at its natural resonant frequency, which usually is in the range of 50 to 100 cycles per second in this particular arrangement designed for testing transistors. If desired, the cam arrangement can be eliminated and the spring rod vibrated by simply displacing it manually, and then letting it go.

If there is a loose particle within the transducer, it causes ultrasonic vibrations in the range of about 30,000 to about 50,000 cycles per second which are transmitted along the rod to the ultrasonic transducer crystal, which is selected to have a peak response in the range of about 35,000 to about 45,000 cycles per second.

The signal from the crystal transducer passes through a hi-pass filter 42 which rejects frequencies below the ultrasonic range. An ultrasonic amplifier 44 amplifies the signal from the hi-pass filter, and the signal from the amplifier may be passed through a variable electronic trigger 45 which drives an indicator lamp 46. The variable trigger passes only signals greater than a minimum value set for the trigger, and thus allows adjustment of transistor particle size rejection level. Thus, when the indicator lamp turns on, it is a signal that the device under test contains a particle which makes the device unacceptable.

Alternatively, the signal from the ultrasonic amplifier passes through a mixer 48 where the signal is combined with the output from an ultrasonic oscillator 50. The ultrasonic oscillator supplies a frequency of about 40,000 cycles per second so that a beat frequency in the audible range of about 15 to 5,000 cycles per second comes from the mixer and passed through a low-pass filter 52, which passes only the signals in the audio frequency range and rejects all signals above the audio frequency. The signal from the low-pass filter is amplified in audio amplifier 53 and passed to a pair of output amplifiers 54 which drive a loud speaker 56 that indicates the presence of a particle in the device under test. Thus, when a device is shaken and emits an ultrasonic frequency, the ultrasonic or noiseless vibration is converted into an audible sound which can be detected by the human ear to indicate the presence of a contaminating particle.

Moreover, the direct coupling between the device under test, the holder, the elongated rod, and the ultrasonic transducer provide for maximum sensitivity of a system to vibrations produced within the device. This permits particles of minute size to be easily detected, and permits detection of particles even when there is a large amount of background noise, such as can occur in machine shops and on production lines.

I claim:

1. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod for holding a device under test, means for vibrating the rod to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

2. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod for holding a device under test, means for vibrating the rod at a frequency below the ultrasonic range to shake the holder and device to cause the said parts to move relative to each other and product ultrasonic vibrations which travel from the holder along the rod to the transducer to produce an electric signal, and means for detecting the signal to indicate the presence of ultrasonic vibrations in the device.

3. Apparatus for detecting ultrasonic vibrations in a device which has parts that move relative to each other and produce ultrasonic vibrations when the device is vibrated, the apparatus comprising an ultrasonic transducer sensitive in the range of about 35 kc. to about 45 kc., an elongated rod having one end in contact with the transducer, a holder on the rod and spaced from the said one end of the rod for holding a device under test, means for vibrating the rod to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

4. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod for holding a device under test, means for vibrating the rod longitudinally to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

5. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod for holding a device under test, and magneto-striction means for vibrating the rod longitudinally to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

6. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod for holding a device under test, means for vibrating the rod transversely to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

7. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod for holding a device under test, electromagnetic means for vibrating the rod transversely to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

8. Apparatus for detecting ultrasonic vibrations in a device which has parts that move relative to each other and produce ultrasonic vibrations when the device is vibrated, the apparatus comprising an ultrasonic transducer, an elongated rod having one end in contact with the transducer, a holder on the rod and spaced from the said one end of the rod, means for releasably securing a device under test to the holder, means for vibrating the rod to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

9. Apparatus for detecting ultrasonic vibrations in a device which has parts that move relative to each other and produce ultrasonic vibrations when the device is vibrated, the apparatus comprising an ultrasonic transducer, an elongated rod having one end mounted adjacent the transducer, a holder on the rod and spaced from the said one end of the rod for holding a device under test, means for vibrating the rod to shake the holder and device to cause the said parts to move relative to each other and produce ultrasonic vibrations which travel from the holder along the rod to the transducer to produce an electric signal, and means for detecting the signal to indicate the presence of ultrasonic vibrations in the device.

References Cited by the Examiner
UNITED STATES PATENTS

| | | | |
|---|---|---|---|
| 1,991,060 | 2/35 | Osbon | 340—261 |
| 2,017,695 | 10/35 | Hahnemann | 340—258 |
| 2,447,333 | 8/48 | Hayes | 340—261 |
| 2,460,316 | 2/49 | Trent | 340—258 |
| 2,571,409 | 10/51 | Beyers | 340—261 |
| 3,095,730 | 2/63 | Matheson | 73—67 |

NEIL C. READ, *Primary Examiner.*